(12) United States Patent
Perez

(10) Patent No.: US 10,540,967 B2
(45) Date of Patent: Jan. 21, 2020

(54) MACHINE READING METHOD FOR DIALOG STATE TRACKING

(71) Applicant: Xerox Corporation, Norwalk, CT (US)

(72) Inventor: Julien Perez, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/350,269

(22) Filed: Nov. 14, 2016

(65) Prior Publication Data
US 2018/0137854 A1 May 17, 2018

(51) Int. Cl.
*G10L 15/22* (2006.01)
*G10L 15/16* (2006.01)

(52) U.S. Cl.
CPC .............. *G10L 15/22* (2013.01); *G10L 15/16* (2013.01)

(58) Field of Classification Search
CPC .......... G10L 15/22; G10L 15/18; G06F 17/30
See application file for complete search history.

(56) References Cited

U.S. PATENT DOCUMENTS

| | | | |
|---|---|---|---|
| 2015/0052084 A1* | 2/2015 | Kolluru | G06T 13/40 706/11 |
| 2015/0095033 A1 | 4/2015 | Boies et al. | |
| 2015/0179170 A1* | 6/2015 | Sarikaya | G10L 15/22 704/275 |
| 2015/0363393 A1* | 12/2015 | Williams | G06F 17/289 704/8 |
| 2016/0351206 A1* | 12/2016 | Gelfenbeyn | G10L 25/48 |
| 2017/0126475 A1* | 5/2017 | Mahkonen | G06F 17/30312 |
| 2017/0287478 A1* | 10/2017 | Schulz | G10L 13/08 |

OTHER PUBLICATIONS

Sukhbaatar et al ("End-to-end Memory Netwoks" Annual Conference on Neural Information Processing System (NIPS) 28, pp. 2240-2248, 2015).*
Yoshino, Koichiro, et al. "Dialogue state tracking using long short term memory neural networks." Proceedings of Seventh International Workshop on Spoken Dialog Systems. 2016. (Year: 2016).*
U.S. Appl. No. 14/864,076, Sep. 25, 2015, Perez, et al.
Berant, et al., "Modeling biological processes for reading comprehension," Proc. 2014 Conf. on Empirical Methods in Natural Language Processing (EMNLP), pp. 1499-1510 (2014).

(Continued)

*Primary Examiner* — Jialong He
(74) *Attorney, Agent, or Firm* — Fay Sharpe LLP

(57) ABSTRACT

A method for dialog state tracking uses a neural network model, such as an MemN2N model, which has been trained to receive a representation of a question and a representation of a subpart of a dialog and to output an answer to the question. For at least one iteration, a subpart of a dialog is received. A representation of the subpart of the dialog is generated. The representation of the subpart of the input dialog and representation of a question are input to the trained neural network model. An answer is output by the neural network model, based on the representation of the question and the representation of the subpart of the input dialog. A dialog state for the dialog is updated, based on the answer to the question. The dialog state includes a set of variables. The updating includes predicting a value for at least one of the variables.

17 Claims, 3 Drawing Sheets

(56) References Cited

OTHER PUBLICATIONS

Bordes, et al., "Learning end-to-end goal-oriented dialog," arXiv:1605.07683, pp. 1-11 (2016).
Bunt, et al., "Towards an ISO standard for dialogue act annotation," Proc. 7th Intl'l Conf. on Language Resources and Evaluation (LREC'10). European Language Resources Association (ELRA), pp. 2548-2555 (2010).
Etzioni, et al., "Machine reading," AAAI Spring Symposium: Machine Reading, pp. 1-5, (2007).
Gasic, et al., "Effective handling of dialogue state in the hidden information state POMDP-based dialogue manager," TSLP, vol. 7(3):4, pp. 1-4 (2011).
Ghahramani, et al., "Factorial hidden Markov models," Machine Learning, vol. 29(2-3), pp. 245-273 (1997).
Graves, et al., "Neural Turing machines," arXiv:1410.5401, pp. 1-26 (2014).
Hermann, et al., "Teaching machines to read and comprehend," Advances in Neural Information Processing Systems(NIPS), pp. 1693-1701 (2015).
Henderson, et al., "The second dialog state tracking challenge," Proc. SIGDIAL Conf., ACL, pp. 263-272 (2014).
Henderson, et al., "The third dialog state tracking challenge," SLT, IEEE, pp. 324-329, (2014).
Henderson, et al., "Deep Neural Network Approach for the Dialog State Tracking Challenge," Proc. SIGDIAL 2013 Conf., pp. 467-471 (2013).
Henderson, et al., "Robust dialog state tracking using delexicalised recurrent neural networks and unsupervised adaptation," Proc. IEEE Spoken Language Technology, pp. 360-365 (2014).
Henderson, et al., Word-based dialog state tracking with recurrent neural networks. In in Proceedings of SIGDIAL, pp. 292-299 (2014).
Joulin, et al., "Inferring algorithmic patterns with stack-augmented recurrent nets," arXiv:1503.01007, pp. 1-10 (2015).
Kumar, et al., "Ask me anything: Dynamic memory networks for natural language processing," arXiv:1506.07285v2, pp. 1-10 (2015).
Metallinou, et al., "Discriminative state tracking for spoken dialog systems," Proc. Conf. Association for Computer Linguistics, pp. 466-475 (2013).
Milone, et al., "Prosodic and accentual information for automatic speech recognition," IEEE Trans. on Speech and Audio Processing, vol. 11(4), pp. 321-333 (2003).
Perez, "Dialog state tracking, a machine reading approach using a memory-enhanced neural network," arXiv:1606.04052v3, pp. 1-19 (2016).
Perez, "Spectral decomposition method of dialog state tracking via collective matrix factorization," Dialogue & Discourse, vol. 7(3) pp. 34-46 (2016).
Perez, et al., "Probabilistic matching for dialog state tracking with limited training data," IWSDS, pp. 1-6 (2016).
Poon, et al., "Machine reading: A 'killer app' for statistical relational AI," Statistical Relational Artificial Intelligence, vol. WS-10-06 of AAAI Workshops. AAAI, pp. 76-81 (2010).
Raux, et al., "Efficient probabilistic tracking of user goal and dialog history for spoken dialog systems," INTERSPEECH, pp. 801-804 (2011).
Richardson, et al., "MCTest: A challenge dataset for the open-domain machine comprehension of text," EMNLP, pp. 193-203 (2013).
Serban, et al., "Building end-to-end dialogue systems using generative hierarchical neural network models," AAAI 2016, pp. 1-8 (2015).
Serban, "A Survey of Available Corpora for Building Data-Driven Dialogue Systems," arXiv:1512.05742v2, pp. 1-46 (2015).
Sukhbaatar, et al., "End-to-end memory networks," Annual Conference on Neural Information Processing Systems (NIPS) 28, pp. 2440-2448 (2015).
Thomson, et al., "Bayesian update of dialogue state: A POMDP framework for spoken dialogue systems," Computer Speech & Language, vol. 24(4), pp. 562-588 (2010).
Wen, et al., "A network-based end-to-end trainable task-oriented dialogue system," arXiv:1604.04562v2, pp. 1-11 (2016).
Weston, et al., "Towards AI-complete question answering: A set of prerequisite toy tasks," arXiv:1502.05698v10, pp. 1-14 (2015).
Weston, et al., "Memory networks," arXiv:1410.3916, pp. 1-15 (2014).
Williams, "Web-style ranking and SLU combination for dialog state tracking," Proc. SIGDIAL, pp. 282-291 (2014).
Williams, et al., "Factored partially observable Markov decision processes for dialogue management," 4th Workshop on Knowledge and Reasoning in Practical Dialog Systems, pp. 76-82 (2005).
Williams, et al., "The dialog state tracking challenge," Proc. SIGDIAL 2013 Conf., pp. 404-413 (2013).
Yeh, et al., "A speech-driven second screen application for TV program discovery," Proc. 26th AAAI Conf. on Artificial Intelligence, pp. 3010-3016 (2014).

\* cited by examiner

MACHINE READING METHOD FOR DIALOG STATE TRACKING

BACKGROUND

The exemplary embodiment relates to dialog systems and finds particular application in connection with a system and method for tracking a dialog state using machine reading.

Automated dialog systems interact with users in a natural language to help them achieve a goal. As an example, a user may be interested in finding a restaurant and may have a set of constraints, such as geographic location, date, and time. The system offers the name of a restaurant that satisfies the constraints. The user may then request additional information about the restaurant. The dialogue continues until the user's questions are answered. There are many other applications where dialog systems could be advantageous. For example, in the context of customer call centers, efficient automation could bring a gain of productivity by increasing the probability of success of each call while reducing the overall cost.

The use of autonomous dialog systems is rapidly growing with the spread of smart mobile devices but still faces challenges to becoming a primary user interface for natural interaction using conversations. In particular, when dialogs are conducted in noisy environments or when utterances themselves are noisy, it can be difficult for the system to recognize or understand the user utterances.

Dialog systems often include a dialog state tracker which monitors the progress of the dialogue (dialog and dialogue may be used interchangeably herein). The dialog state tracker provides a compact representation of the past user input and system output in the form of a dialog state. The dialog state encapsulates the information needed to successfully finish the dialogue, such as the user's goal or requests. The term "dialog state" loosely denotes a representation of the knowledge of user needs at any point in a dialogue. The precise nature of the dialog state depends on the associated dialog task. An effective dialog system benefits from a state tracker which is able to accumulate evidence, in the form of observations, accurately over the sequence of turns of a dialogue, and adjust the dialog state according to the observations. However, in spoken dialog systems, where the user utterance is input as a voice recording, the errors incurred by Automatic Speech Recognition (ASR) and Natural Language Understanding (NLU) means that the true user utterance may not be directly observable. This makes it difficult to compute the true dialog state.

A common mathematical representation of a dialog state is a slot-filling schema. See, for example, Williams, et al., "Partially observable Markov decision processes for spoken dialog systems," Computer Speech & Language, 21(2):393-422, 2007, hereinafter, "Williams 2007," In this approach, the state is composed of a predefined set of variables with a predefined domain of expression for each of them. The goal of the dialog system is to instantiate each of the variables efficiently in order to perform an associated task and satisfy the corresponding intent of the user. In the restaurant case, for example, this may include, for each of a set of variables, a most probable value of the variable, such as: location: downtown; date: August 14; time: 7.30 pm; restaurant type: Spanish, (or unknown if the variable has not yet been assigned).

Various approaches have been suggested for defining dialog state trackers. Some systems use hand-crafted rules that rely on the most likely result from an NLU module. See, Williams, "Web-style ranking and SLU combination for dialogue state tracking," Proc. SIGDIAL, pp. 282-291, June 2014; Nuance Communications, "Grammar developers guide. Technical report," Nuance Communications, 1380 Willow Road, Menlo Park, Calif. 94025, 2007. More recent methods take a statistical approach to estimating the posterior distribution over the dialog states using the results of the NLU step. Statistical dialog systems, in maintaining a distribution over multiple hypotheses of the true dialog state, are able to behave in a more robust manner when faced with noisy conditions and ambiguity.

Statistical dialog state trackers can be categorized into two general approaches (generative and discriminative), depending on how the posterior probability distribution over the state calculation is modeled. The generative approach uses a generative model of the dialog dynamic that describes how the NLU results are generated from the hidden dialog state and uses the Bayes rule to calculate the posterior probability distribution. Generative systems are described, for example, in Williams 2007; Williams, "Exploiting the ASR n-best by tracking multiple dialog state hypotheses," INTERSPEECH, pp. 191-194, 2008; and Williams, "Incremental partition recombination for efficient tracking of multiple dialog states," ICASSP, pp. 5382-5385, 2010. The generative approach has been popular for statistical dialog state tracking, since it naturally fits into the Partially Observable Markov Decision Process (POMDP) type of modeling, which is an integrated model for dialog state tracking and dialog strategy optimization. See, Young, et al., "POMDP-based statistical spoken dialog systems: A review," Proc. IEEE, 101(5):1160-1179, 2013. In the context of POMDP, dialog state tracking is the task of calculating the posterior distribution over the hidden states, given the history of observations.

The discriminative approach aims at directly modeling the posterior distribution through an algebraic closed formulation of a loss minimization problem. Discriminative systems are described, for example, in Paek, et al., "Conversation as action under uncertainty," UAI '00: Proc. 16th Conf. in Uncertainty in Artificial Intelligence, pp. 455-464, 2000; and Thomson, et al., "Bayesian update of dialog state: A POMDP framework for spoken dialogue systems," Computer Speech & Language, 24(4):562-588, 2010.

Two limitations have been observed in the application of the current types of inference model. First, current models tend to fail in considering long-distance dependencies that can occur in dialogs. For example, coreference and inter-utterance information has been shown to be difficult to manage. This is the case even when recurrent network models are used, as described, for example, in Matthew Henderson, et al., "Robust dialog state tracking using delexicalised recurrent neural networks and unsupervised adaptation," Proc. IEEE Spoken Language Technology, pp. 360-365, 2014. Second, reasoning capabilities, as required in machine reading applications, remain absent in these classic formalizations of dialog state tracking. See Hoifung Poon, et al., "Machine reading: A 'killer app' for statistical relational AI," Statistical Relational Artificial Intelligence, volume WS-10-06 of AAAI Workshops. AAAI, pp. 76-81, 2010; Oren Etzioni, et al., "Machine reading," AAAI Spring Symposium: Machine Reading, pp. 1-5, 2007, hereinafter, Etzioni 2007; Jonathan Berant, et al., "Modeling biological processes for reading comprehension," Proc. 2014 Conf. on Empirical Methods in Natural Language Processing (EMNLP), pp. 1499-1510, 2014, hereinafter, Berant 2014; Jason Weston, et al., "Towards AI-complete question answering: A set of prerequisite toy tasks," arXiv: 1502.05698v10, pp. 1-14, 2015, hereinafter, Weston 2015.

A dialog tracking system and method are described herein which are better adapted to incorporating long-range information and reasoning capabilities.

INCORPORATION BY REFERENCE

The following references, the disclosures of which are incorporated herein by reference in their entireties, are mentioned:

U.S. Pub. No. 20150095033, published Apr. 2, 2015, entitled TECHNIQUES FOR UPDATING A PARTIAL DIALOG STATE, by Boies, et al.

U.S. application Ser. No. 14/864,076, filed Sep. 25, 2015, entitled GENERATIVE/DISCRIMINATIVE APPROACH FOR TRANSACTIONAL DIALOG STATE TRACKING VIA COLLECTIVE MATRIX FACTORIZATION, by Julien Perez, et al.

U.S. application Ser. No. 15/342,590, filed Nov. 3, 2016, entitled, PROBABILISTIC MATCHING FOR DIALOG STATE TRACKING WITH LIMITED TRAINING DATA, by Julien Perez, et al.

BRIEF DESCRIPTION

In accordance with one aspect of the exemplary embodiment, a method for dialog state tracking includes providing a neural network model which has been trained to receive a representation of a question and a representation of an input subpart of a dialog and to output an answer to the question based on the representation of the subpart of the dialog. For at least one iteration, an input subpart of a dialog is received. A representation of the subpart of the dialog is generated. The representation of the subpart of the input dialog is input to the trained neural network model. A representation of a question is input to the trained neural network model. An answer output by the neural network model, based on the representation of the question and the representation of the subpart of the input dialog, is received. For at least one of the at least one iterations, a dialog state for the dialog is updated, based on the answer to the question. The dialog state includes a set of variables. The updating includes predicting a value for at least one of the variables.

At least one of the generating a representation of the subpart of the dialog, inputting the representation of the subpart of the dialog to the trained neural network model, receiving an answer to the question output by the model, and updating a dialog state may be performed with a processor.

In accordance with another aspect of the exemplary embodiment, a system for dialog state tracking comprising: memory which stores a neural network model which has been trained to receive a representation of a question and a representation of an input subpart of a dialog and to output an answer to the question based on the representation of the subpart of the dialog a dialog representation generator which generates a representation of an input subpart of a dialog; a prediction component which inputs the representation of the subpart of the dialog and a representation of a question to the trained neural network model and receives an answer output by the neural network model based on the representation of the question and the representation of the subpart of the dialog; an update component which updates a dialog state for the dialog, based on the answer to the question, the dialog state including a set of variables, the updating including predicting a value for at least one of the variables. A processor implements the dialog representation generator, prediction component, and update component.

In accordance with another aspect of the exemplary embodiment, a method for training a dialog state tracking system includes providing a set of triples, each of the triples including a dialog subpart, and a ground truth answer to a natural language question, the ground truth answer having been provided by an annotator based on the dialog subpart, each of the questions being related to a respective one of a plurality of slots of a dialog state tracker. A representation generator is provided, in memory, for generating representations of the dialog subparts and questions. iteratively, with a processor, a representation of the dialog subpart and a representation of the question of at least one of the triples are input to a memory end-to-end neural network model. A predicted answer is output from the model, based on the dialog subpart and question. Parameters of the model are updated to reduce a computed error between the predicted answer and the ground truth answer for the at least one of the triples. The model with updated parameters of at least one of the iterations is stored in memory. An update component is provided, in memory, whereby, when a new dialog subpart is received, a representation of the dialog subpart and a representation of question are able to be input to the stored model for predicting an answer to the question, the update component updating the dialog state based on the answer.

DETAILED DESCRIPTION

A system and method for dialog state tracking are described which employ a dialog state tracking model that includes one or more memory-enhanced neural networks (MemN2N). This type of neural network approximates reasoning capabilities that have been found to be particularly well adapted to the sequential, long range dependencies and sparse nature of complex dialog state tracking tasks. The exemplary model relaxes the usual requirement for strict utterance-level annotation of training dialogs, which can be time consuming and costly. Instead, annotations at the sub-dialog level or full-dialog level can be employed. The system and method find application in transactional dialog tracking applications, such as those conducted between a user, such as a customer, and a dialog agent, such as a computer-implemented virtual agent.

A dialog state tracking task can be formalized as follows: at each turn of a dyadic (two-person) dialog, the dialog agent chooses a dialog act d to express and the user answers with an utterance u. The dialog state at each turn of a given dialog may be defined as a distribution over a set of predefined variables, which define the structure of the state. See, for example, Jason D. Williams, et al., "Factored partially observable Markov decision processes for dialogue management," 4th Workshop on Knowledge and Reasoning in Practical Dialog Systems, pp. 76-82, 2005. The state tracking task may entail estimating the values of the set of predefined variables (slots) in order to perform a procedure or transaction which is the purpose of the dialog. In the exemplary system and method, the predicted slot values are modeled as answers to natural language questions, or values that are derived based on the answers, that are predicted with the neural network.

Figure 1:
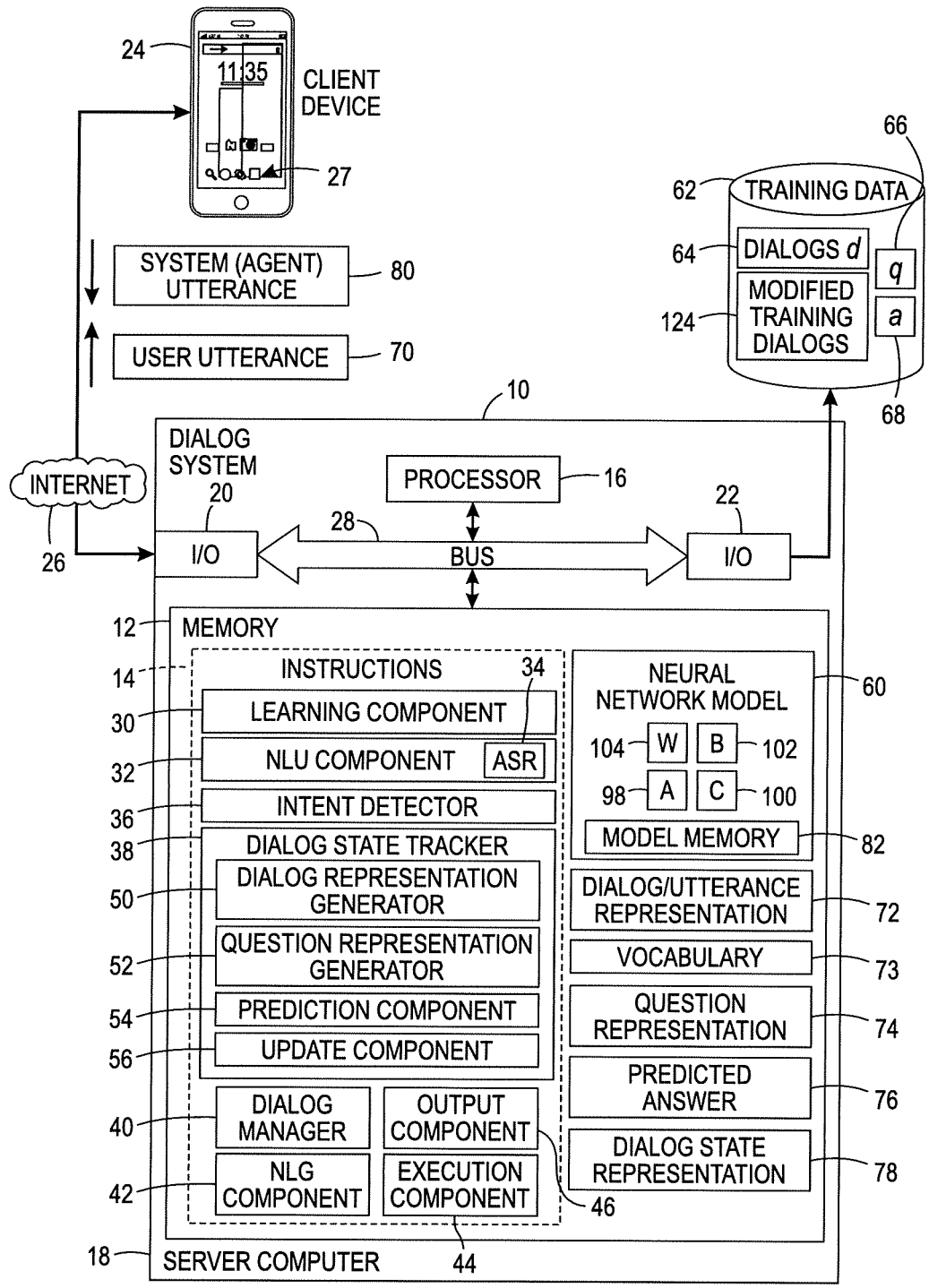
FIG. 1 is a functional block diagram of a dialog system in accordance with one aspect of the exemplary embodiment.

With reference to FIG. 1, a dialog system 10 is shown. The dialog system is configured for conducting a dialog in a natural language, such as English or French, between a (virtual) agent and a user. The exemplary system sequentially updates its belief of the dialog state using information extracted from user (and agent) utterances.

Figure 2:
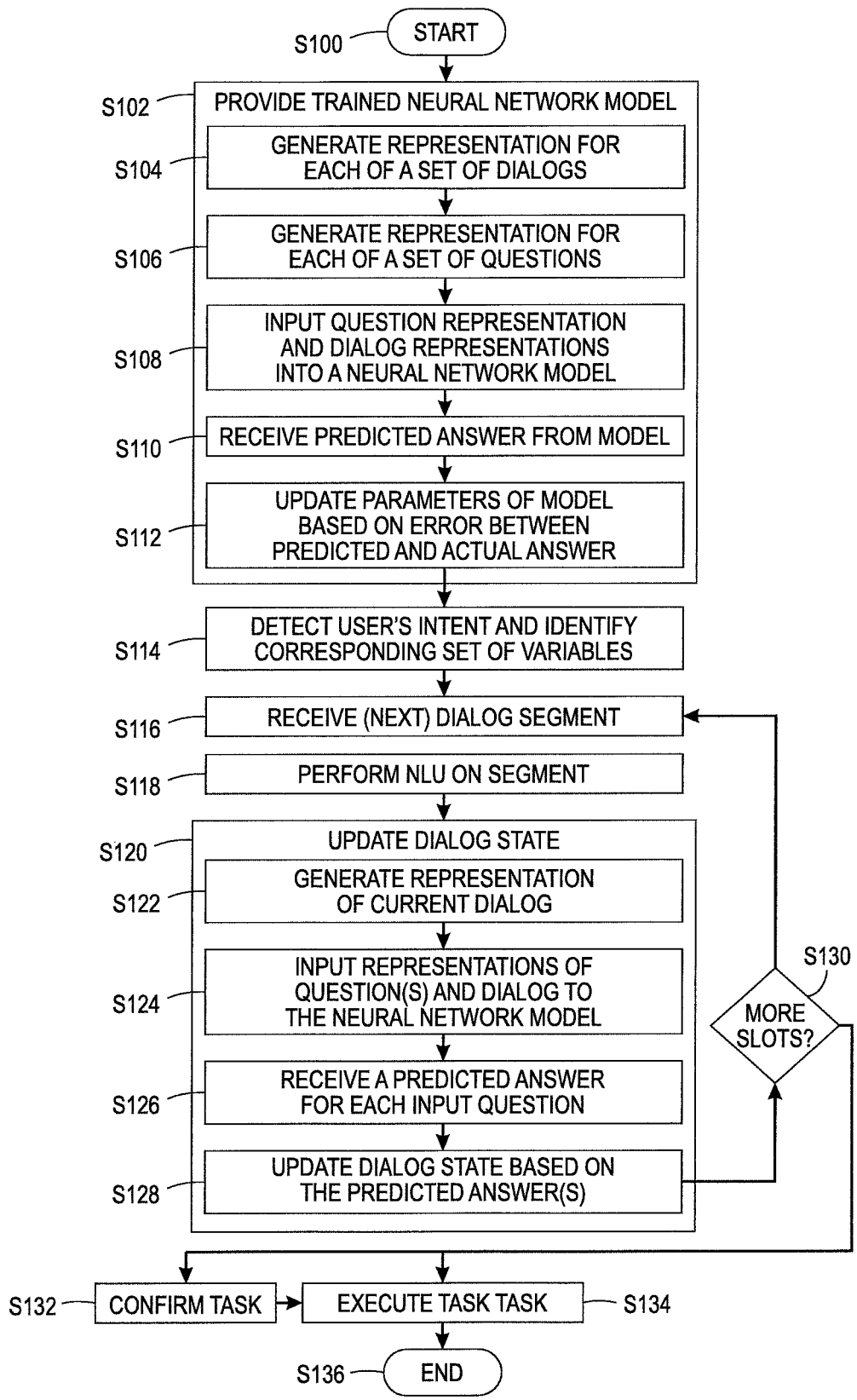
FIG. 2 is a flow diagram illustrating a dialog tracking method in accordance with another aspect of the exemplary embodiment.

The dialog system 10 includes memory 12 which stores instructions 14 for performing the method illustrated in FIG. 2 and a processor 16 in communication with the memory for executing the instructions. The system 10 may include one or more computing devices 18, such as the illustrated server computer. One or more input/output devices 20, 22 allow the system to communicate with external devices, such as the illustrated client device 24 via wired or wireless connections 26, such as the Internet, telephone line, mobile communication network, or the like. In another embodiment, the system may be at least partially resident on the client device. The client device 24 includes an audible and or visual output device 27, such as a display screen and/or speaker(s). Hardware components 12, 16, 20, 22 of the system are communicatively connected by a data/control bus 28.

The illustrated instructions 14 include a learning component 30, a natural language understanding (NLU) component 32 which may include or have access to an automated speech recognition (ASR) component 34, an intent detector 36, a dialog state tracker 38, a dialog manager 40, a natural language generation (NLG) component 42, an execution component 44, and an output component 46. The dialog state tracker 38 includes a dialog representation generator 50, a question representation generator 52, a prediction component 54, and an update component 56.

The learning component 30 learns a neural network model 60, specifically, an end-to-end memory network (MemN2N) model or set of models. This is a type of recurrent neural network (RNN) architecture where the recurrence reads from a possibly large external memory multiple times before outputting a symbol. See, Sainbayar Sukhbaatar, et al., "End-to-end memory networks," Annual Conf. on Neural Information Processing Systems (NIPS) 28, pp. 2440-2448, 2015 ("Sukhbaatar 2015"). The model 60 is learned using training data 62. The training data 62 includes a collection of training dialogs 64, each of which may be an entire dialog or a subdialog (i.e., a part of a dialog comprising one or more utterances). At least some of the training dialogs include at least two utterances, such as at least one agent utterance and at least one user utterance. Some dialogs include a sequence of more than two utterances, such as three, four, five, or more utterances. Each training dialog 64 is associated with at least one question 66 and respective corresponding answer 68, in natural language form. Each of the answers 68 is provided by a human annotator as being a correct response to a respective one of the questions 66, based on a review of the dialog 64. Each of the answers can be a word, multi-word phrase, date, time, number, or other character string, depending on the variable and the type of question. For example, a yes/no question may be formulated which asks "is the value of the Area slot north?," which could be answered with yes or no (or in some cases maybe). Another type of question could ask, what is the value of the Area slot? The model 60 learns to predict an answer, given a question and a new dialog. The learned model 60 is then stored in memory 12 for use by the dialog state tracker 38.

The NLU component 32 receives human-generated utterances u 70 in the form of speech or text from the client device 24 and converts them to a form that can be processed by the dialog state tracker 38. In the case of spoken utterances, this may include speech-to-text conversion with the ASR component 34. The NLU component 32 processes the user utterance and may generate an N-best list $o=\{(d_1, f_1), \ldots, (d_n, f_n)\}$, where $d_i$ is the hypothesized user dialog act (what the user is inferred to have said) and $f_i$ is its confidence score. N may be a number which is at least 1. In a text based dialog system, where the utterances are in the form of text strings, the ASR module and optionally also the NLU module may be omitted and the text string(s) considered as the user dialog act d.

In one embodiment, if prosodic information (e.g., information on intonation, tone, stress and/or rhythm of the user utterance 70) is available in the output of the ASR system 34, it can also be considered as part of the observation. See, Milone, et al., "Prosodic and accentual information for automatic speech recognition," IEEE Trans. on Speech and Audio Processing, 11(4):321-333, 2003. Similarly, a detected named entity identified by a spoken language understanding (SLU) module (not shown) may also be incorporated as part of the observation. For ease of description, in the following, only the bag of words corresponding to a dialog act d is considered as an observation at a given turn of the dialog, however, a bag of n-grams representation could be used.

If there is more than one type of transaction handled by the system 10, the intent detector 36 may be used to identify the user's intent in order to determine the set of variables to be instantiated in the model 60. As an example, the user of the client device 24 may express an intent to book a flight and the intent detector identifies the variables: origin, destination, date, and time (hour), etc., which are each to be instantiated from a respective set of predefined values. The variables correspond to the slots to be filled by the belief update component 56.

The statistical dialog state tracker 38 maintains, at each discrete time step t, the probability distribution over states, $b(s_t)$, which is the system's belief over the state. This type of dialog management assumes that a set of variables are required for each predefined intention. The actual slot filling process is composed of the cyclic tasks of information gathering and integration, in other words, dialog state tracking. In such a framework, the purpose is to estimate, as early as possible in the course of a given dialog, the correct instantiation of each variable. In the following, it is assumed the state is represented as a set of variables with a set of known possible values associated to each of them, although slots which can take a range of values may also be considered in some cases.

The dialog representation generator 50, which is used in both training and prediction, generates a representation 72 of each utterance individually or the set of utterances forming a dialog. The representation 72 may be a bag-of-words representation in which each element (dimension) in a V-dimensional vector represents a respective word in a predefined vocabulary 73 and is assigned a value representing whether the word is present in the dialog/utterance or not. The predefined vocabulary 73 may be generated from the set of training dialogs 64 (and optionally also the questions 74). For example, term frequency-inverse document frequency (tf-idf) scores, or the like are used to rank the words used in the training dialogs and the top-ranking ones are selected to form the vocabulary 73. A vocabulary of 200-10,000 words may be generated. In one embodiment, words may be represented in the vocabulary 73 by a root (lemma) form so that, for example, a plural noun in an utterance is mapped to its singular form in the vocabulary. In some embodiments, the words in the vocabulary may include multi-word expressions common to the topic of the dialog, such as "fast food," in the case of a restaurant topic.

The question representation generator 52, which is used in both training and prediction, generates a representation 74 of each of a set of natural language questions 66, each question formulated to generate an answer 76 related to one of the variables being tracked, based on the dialog. As for the dialog representation, the question representation 74 may be a bag-of-words representation in which each element of a V-dimensional vector represents a word in the predefined vocabulary 73.

As will be appreciated, a single representation generator can be used in place of separate components 50, 52 to generate the representations 72, 74.

The representations 72, 74 are sparse vectors and are embedded in an embedding space of smaller dimensionality n by embedding matrices of the model 60.

The prediction component 54 inputs the dialog and question representations 72, 74 into the trained neural network model 60, which outputs a predicted answer 76. This may be the most probable answer or a distribution over a set of answers.

The update component 56 updates a representation 78 of the dialog state, based on the output answer 76. The answer 76 may be used to update the state for an existing variable, may be used as an indicator that there is insufficient information to predict the value for a given variable, may be used to instantiate a new variable, or the like.

In this way, the dialog state tracker sequentially updates its belief of the dialog state 78 using information extracted from the utterances received up to that time.

The dialog manager 40 determines the next information to be provided or sought, based on the current belief 78 and a given dialog policy, and provides this to the NLG component 42. The NLG component 42 then generates a dialog act (next utterance) 80 of a virtual agent, based on the input from the dialog manager. The dialog act 80 may be in the form of speech, text, or information for generation of the speech or text by the client device 24. The output component 42 outputs the dialog act 80 to the client device which renders the utterance in human recognizable form, e.g., audible and/or readable form, on the output device 27. In one embodiment, when the dialog manager 40 determines that the slots representing the constraints have all been filled, it passes the values in the slots to the execution component 44, which executes a task based on the values, e.g., making a restaurant or flight reservation in an illustrative embodiment. Provision may be made for a human agent to participate in the dialog, for example, if the dialog manager 40 determines that the dialog is not advancing the belief over the dialog state.

The output component 46 outputs information, such as agent utterances 80, details of a transaction, and so forth, from the system.

The computer-implemented system 10 may include one or more computing devices 18, such as a desktop, laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The network interface 20, 22 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 18.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates a dialog tracking method. The method begins at S100.

At S102, a trained neural network model 60 is provided, e.g., generated using training data 62 or an existing one accessed. This may include, for each of a set of training dialogs 64, generating a representation of a dialog (S104), generating a representation 74 of each of a set of questions 66 (S106), inputting the question representation into a neural network model 60 (S108), receiving a predicted answer 76 from the model (S110), and updating parameters of the model 60 to reduce an error between the predicted answer 76 and a ground truth answer 68, provided by an annotator (S112). After a fixed number of iterations or when another stopping point criterion is met, the trained model 60 may be stored in memory 12.

At S114, at or near the start of a dialog between a user and an agent, the user's intent may be detected, by the intent detection component 36, and the set of variables to be tracked and respective trained model 60 to be used for that topic are identified.

At S116, a (next) segment of the dialog is received, such as a user and/or agent utterance 70, 80.

At S118, the dialog segment is processed to generate a text sequence, e.g., with the NLU component 32.

At S120, a dialog state representation 78 is updated, based on the text sequence (together with any previously received text sequences of the dialog). The updating includes filling/updating slots of the representation 78 with variables in some or all iterations of this step. As will be appreciated, not all utterances include information which advances the dialog state. The slot filling may include: generating a representation 72 of the dialog to date (S122), inputting the dialog representation and one or more of the question representations 74 into the trained neural network model 60 (S124), receiving a predicted answer 76 or distribution over answers from the model 60 for each input question (S126), and updating the dialog state based on the predicted answer(s) to the one or more questions (S128).

These steps are performed substantially iteratively until the predefined slots are each filled, e.g., with a respective most probable value of the respective variable having at least a threshold probability score. Step S128 outputs a current dialog state $D_{t+1}$, which is input as $D_t$ in the next iteration.

If at S130, there are remaining slots to be filled, the method then returns to S116. Once all the variables have been instantiated, as in existing dialog systems, a last general confirmation of the task wished by the user may be performed (S132) before executing a requested task (S134). The method ends at S136.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be provided.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Machine Reading Formulation of Dialog State Tracking

In the system and method described herein, the dialog state tracking problem is formulated as a machine reading task which is solved using the learned memory-enhanced neural architecture for inference. Etzioni 2007 and Berant 2014, referred to above, provide a background to machine reading. Dialog state tracking is then understood as the capability of inferring a set of latent values l associated to a set of variables v related to a given dyadic or multi-party conversation d, by direct correlation and/or reasoning, using the course of exchanges of utterances. The probability p of a given value l is a function of the dialog d and the variable v: $p(l|d,v)$. The general task of machine reading will first be described, followed by a description of a memory-enhanced neural network architecture (MemN2N) 60 suited to handling such tasks in the context of dialogs.

The number of variables is not specifically limited but is at least two, or at least three, and is generally at least four, and may be no more than twenty in some embodiments. Each of the variables has at least two possible values.

Machine Reading

The task of textual understanding can be formulated as a supervised learning problem. For a discussion of machine reading, see, for example, Ankit Kumar, et al., "Ask me anything: Dynamic memory networks for natural language processing," arXiv:1506.07285v2, 2015, hereinafter, Kumar 2015; Karl Moritz Hermann, et al., "Teaching machines to read and comprehend," Advances in Neural Information Processing Systems (NIPS), pp. 1693-1701, 2015. In general, the task entails estimating the conditional probability $p(a|d,q)$ of an answer a to a question q where d is a document. In the present case of dialog state tracking, the document is a representation 72 of a dialog or a sub-dialog. The training corpus 62 is used to provide a set of {document, query, answer} triples. This avoids the need to provide state updates at an utterance level for training as generally required. See, Matthew Henderson, et al., "The third dialog state tracking challenge," SLT, pp. 324-329, IEEE, 2014, hereinafter, Henderson 2014. Formalizing dialog state tracking at a subdialog level in order to infer hidden state variables with respect to a list of utterances started from the first one to any given utterance of a given dialog, as described herein, is particularly useful. A training corpus 62 of two to three thousand of such training dialogs 64 is shown in the examples below to be sufficient to train the model 60.

In one embodiment, the training dialogs in the training corpus may have an average (mean) number of utterances of at least four utterances and in some embodiments, at least six utterances, the triples including a query and an answer which is not specifically linked to one of the utterances, but to the entire dialog.

While available training datasets for state tracking do not explicitly cover reasoning capabilities, such as temporal and spatial reasoning, counting, sorting and deduction, modified datasets of training dialogs expressing such specific abilities can be generated for enhanced reasoning, as described below.

End-to-End Memory Networks

The model 60 takes as input a discrete set of inputs $\{x_1; \ldots; x_n\}$ 72 that are stored in memory 82 of the model, and a query q 74, and outputs an answer a 76. Each of the $x_i$, q, and a contain symbols coming from a finite vocabulary 73 of V words. The model 60 may write all the inputs x to the model memory 82 up to a fixed buffer size, and then find a continuous representation for the x and q. The continuous representation is then processed via multiple hops to output a distribution over a. This allows backpropagation of the error signal through multiple memory accesses back to the input during training. This type of approach allows the use of stochastic gradient-based learning strategies and provides for inference with a memory component 82 that can be read and written to. The model 60 is trained to learn how to operate effectively with a memory component and enable it to capture more complex reasoning dynamics that other model lack.

Figure 3:
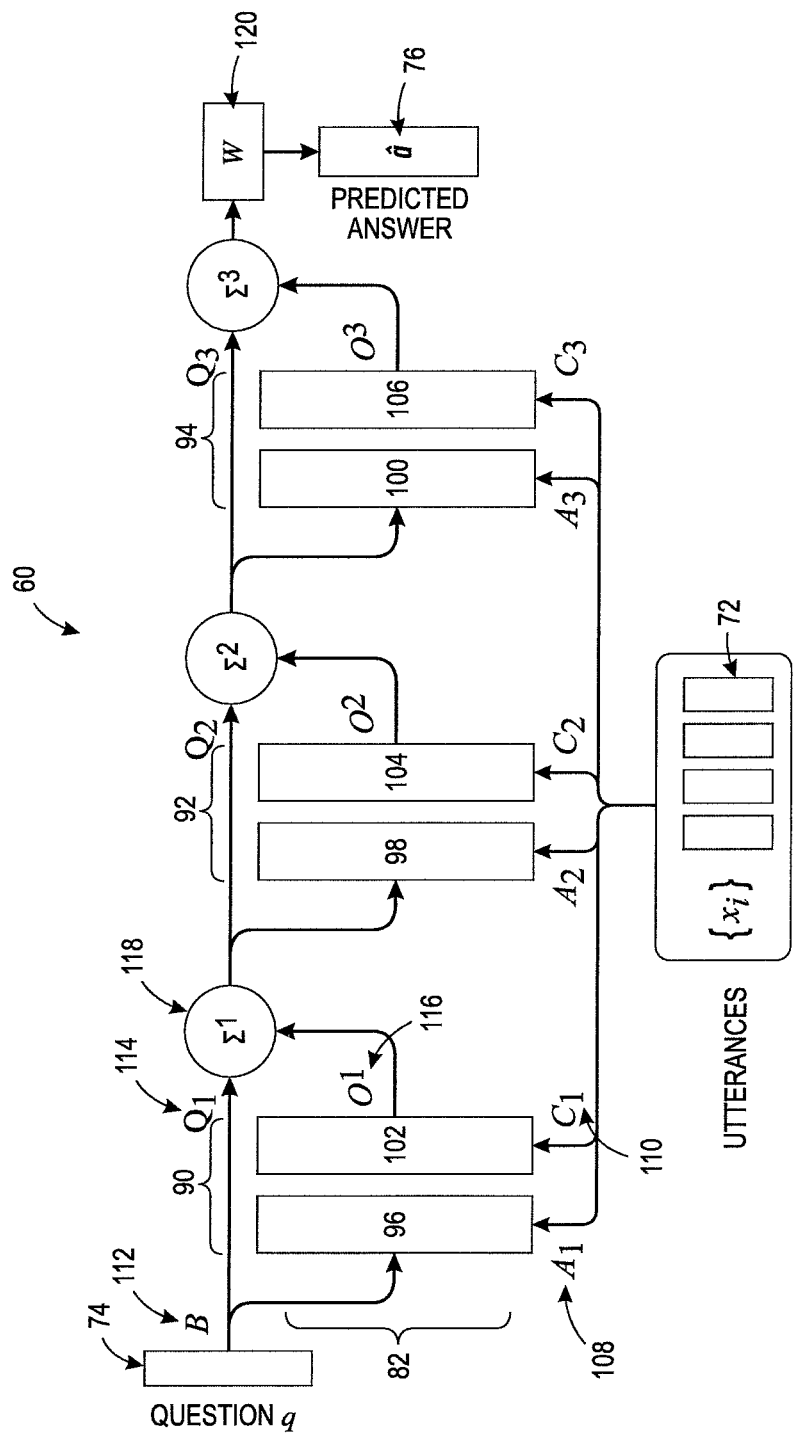
FIG. 3 illustrates an exemplary memory-enhanced neural network in the system of FIG. 1.

FIG. 3 shows an exemplary MemN2N architecture 60, which is based on that described in Sukhbaatar 2015 and Jason Weston, et al., "Memory networks," arXiv:1410.3916, 2014 (Weston 2014).

The neural network 60 includes a set of layers (or hops) 90, 92, 94, three in the illustrated embodiment, although fewer or more than three layers may be employed, such as 4, 5, 6, or more layers. As an example, from 3-5 layers are used in the model. Memory 82 includes a set of input and output memories 96, 98, 100, 102, 104, 106 with memory cells. The input set $x_1, \ldots, x_N$ (i.e., a set of dialog representations 72) are stored in the memory cells as vectors. In each layer, the entire set $\{x_i\}$ are converted into input memory vectors $\{m_i\}$ of dimension n, computed by embedding each $x_i$ (e.g., each sentence of a dialog) in a continuous space using a transformation. The transformation is an embedding matrix A of size n×|V|, where n is the embedding size and |V| the vocabulary size. The memory vectors $\{m_i\}$ are stored in input memories 96, 98, 100. The entire set $\{x_i\}$ are thus converted into output memory vectors $\{c_i\}$ of dimension n, computed by embedding each $x_i$ using an embedding matrix C, also of size n×|V|, and stored in output memories 102, 104, 106. The number n of latent variables may be, for example, from 10-1000, such as 10-100, e.g., 20. Thus, for a vocabulary size of 2000 words (or n-grams), the matrices A and C may have a size of 40,000 weights. The matrix A may be referred to as a weight matrix and matrix C as a bias term matrix. In the exemplary embodiment, the embedding computes $m_i = A\Phi(x_i)$ and $c_i = C\Phi(x_i)$, where $\Phi(.)$ is a function that maps the input $x_i$ into a bag of dimensions |V|. Each layer may have respective weight and bias term matrices 108, 110, denoted $A_1$, $A_2$, $A_3$ and $C_1$, $C_2$, $C_3$, respectively, or use the same matrices A and C.

Similarly, the question q 74 is encoded using a n×|V| question embedding matrix 112 denoted B, resulting in a question embedding $Q = B\Phi(q)$ of the same number of dimensions as the utterance embeddings (S106).

The input memories $\{m_i\}$, together with the embedding Q 114 of the question q, are utilized to determine the match between Q and each memory $m_i$ by taking the inner product followed by a softmax, yielding in a probability vector of attention weights $p_i$:

$$p_i = \text{softmax}(Q^T m_i) \quad (3)$$

where T represents the transpose operation and the softmax is computed using the formula $$\text{softmax}(a_i) = \frac{e^{a_i}}{\sum_i e^{a_i}}$$

(in this case, $a_i = (Q^T m_i)$). However, other non-linear functions may be employed in place of the softmax. Subsequently, the response vector o 116 from the output memory 102, etc., is constructed as a sum over the embedded inputs $c_i$, each weighted by the respective probability vector $p_i$ for the embedded question Q with respect to the corresponding embedded input $m_i$:

$$o = \sum_i p_i c_i \quad (4)$$

The respective output $\Sigma$ 118 from each layer 90, 92, etc. includes a respective o and Q.

As illustrated in FIG. 3, the model can be extended to include more than one set of input/output memories by stacking a number of memory layers 90, 92, 94, each with a respective output $\Sigma_i$. In this setting, each memory layer is named a hop and the $(k+1)^{th}$ hop takes as input the output of the $k^{th}$ hop:

$$Q^{k+1} = o^k + Q^k \quad (1)$$

For the final step, the prediction of the answer â 76 to the question q 74, is computed as a function of the last o and Q, e.g., the function may be a softmax:

$$â = \text{softmax}(W(o^K + Q^K)) \quad (6)$$

where â is the predicted answer distribution (a vector), $W \in \mathbb{R}|V| \times n$ is a parameter matrix 120 for the model 60 to learn, and K is the total number of hops. The matrix W effectively transforms the vector of latent values that is a sum of $o^K + Q^K$ into the dimensionality of the predicted answer. For example, if the corresponding slot (e.g., Restaurant Area) has ten possible values, the output vector â may have ten dimensions if the question is of the type what is the area of the restaurant? The softmax ensures that all values in the output vector â sum to 1. Other functions could alternatively be used.

In the case of the bag-of-words (BoW) representation of an utterance, the embedding of an utterance or longer dialog $x_i = \{x_{i1}, x_{i2}, \ldots, x_{iZ}\}$, may include embedding each word and summing the resulting vectors: e.g., $m_i = \Sigma_j A x_{ij}$ and $c_i = \Sigma_j C x_{ij}$. The input vector Q representing the question is also embedded as a bag of words $Q = \Sigma_j B q_j$. This type of embedding does not capture the order of the words in the utterance, which may be relevant in some cases. A modified type of embedding can encode the position of the words in the utterance and/or provide temporal encoding as described, for example, in Sukhbaatar. For example, in positional encodings, $m_i = \Sigma_j l_j \cdot A x_{ij}$, where the dot · is an element-wise multiplication, $l_j$ is a 4 column vector with the structure $l_{kj} = (1-j/J) - (k/n)(1-2j/J)$ (assuming 1-based indexing), with J being the number of words in the sentence, and n is the dimension of the embedding.

Other models of parametric encoding for a question and a dialog may be used in place of the illustrative embedding function $\Phi$, e.g., as described in Kumar 2015.

Different weight tying schemes of the embedding matrices A and C can also or alternatively be used, e.g., as described in Weston 2015 and Weston 2014:

1. Global: all the weight matrices $A^k$ and $C^k$ are shared across different hops, i.e., $A^1=A^2=\ldots=A^k$ and/or $C^1=C^2\ldots=C^k$.

2. Hop-specific: each hop has its specific weight matrix $A^k$ and bias term matrix $C^k$ for $k \in [1, K]$ and they are optimized independently.

Training the Neural Network

In one embodiment, a respective model 60 is provided for each slot (variable) of the dialog state and is trained using representations of questions 66 and answers 68 that are specific to the slot. For example, for a destination in a trip planning system, the question may be "what is the destination?" or "where does the user want to go?" In another embodiment, a multi-slot model 60 is trained using questions and answers for multiple slots.

Training entails learning the parameters of the model (S112), which in the illustrated case are the matrices B, W, $A^1, A^2, \ldots A^k$ and $C^1, C^2, \ldots C^k$. This can be performed, for example, using stochastic gradient descent. At each iteration, a bag of words representation 74 of a question is input to the model 60 together with a vectorial representation of the respective groundtruth answer 68, which may be a binary vector with a value of 1 for the slot to which the question relates, with all other elements being zero. The memories 96, etc. are generated from the representations of the training dialogs, using initial values for matrices $A^1, A^2, \ldots, A^k$ and $C^1, C^2, \ldots C^k$, which may be selected randomly, e.g., from a Gaussian distribution, or based on a previously trained model. The input question representation 74 is processed by the model 60, generating a predicted answer vector â 76. A loss E is computed between the predicted answer vector 76 and the true answer vector. Matrixes W, $A^1, A^2, \ldots A^k$ and $C^1, C^2, \ldots C^k$ can thus be jointly and iteratively learned by minimizing a standard cross-entropy loss E between â and the true label a. In one embodiment, updates to matrix W may be sequentially back-propagated to the other matrices $A^1, A^2, \ldots A^k$ and $C^1$, $C^2, \ldots C^k$ and B. After a large number of such iterations, the learned matrices B, W, $A^1, A^2, \ldots A^k$ and $C^1, C^2, \ldots C^k$ are stored in memory 12. The learning rate η used for controlling the amount of the parameter updates at each iteration, can be fixed or varied throughout the training.

In the following, specific embodiments suited to the task of dialog state tracking are described in the context of machine reading which can be solved using such memory enhanced model.

Dialog Reading Model for State Tracking (S124)

The reading model 60 assumes a dyadic dialog d composed of a list of utterances 72, a dialog state composed of a set of variables $v_i$ with $i=\{1, \ldots, n_v\}$ and a set of corresponding assigned values $l_i$. A question $q_v$ can be defined that corresponds to the specific querying of a variable in the context of a dialog $p(l_i|q_{v_i}, d)$. In such a context, a dialog state tracking task entails determining, for each variable v, the optimal value of the variable, denoted l*=arg $\max_{l_i \in L} p(l_i|q_{v_i}, d)$, where L represents the specific domain of expression of a variable $v_i$ (the set or range of possible values). Thus by inputting a set of questions to a multi-slot model, or a single question to each of a set of slot specific models, the optimal current value for each slot of the dialog state can be predicted.

In one embodiment, other, more complex reasoning tasks can be performed by providing rule-based modifications over the training corpus 62 to generate a modified set of training dialogs 110. This allows development of resolution algorithms that are not dedicated to a specific reasoning task but inference models that can be as generic as possible.

Examples of reasoning tasks associated to dialog state tracking are now described and illustrated with examples.

1. Factoid (One Supporting Fact) Questions

This task corresponds to the illustrated formulation of dialog state tracking. It involves questions 74 where a previously given single supporting fact, potentially amongst a set of other irrelevant facts, provides the answer. This kind of task is described in Weston 2014, in the context of a virtual world. Thus for example, for the question "what is the destination" the answer may be drawn from a set such as "Paris, Rome, New York, . . . "

2. Yes/No Questions

This task provides the ability of a model to answer true/false type questions such as "Is the food italian?" The conversion of a dialog set to such a format is deterministic given that the utterances and corresponding true states are known for each utterance of a given training dialog. Thus, for example, a restaurant lexicon stores names of restaurants and food types and can be used to tag dialogs with the food types of the mentioned restaurants.

3. Indefinite Knowledge

This task provides a complex natural language construction. It enables statements to be modeled in order to describe possibilities rather than certainties, as proposed in Weston 2014. In the present case, the answer could be "maybe" to the question "Is the price-range moderate?" if the slot has not been mentioned yet throughout the current dialog. In the case of dialog state tracking, this allows dealing seamlessly with unknown information about the dialog state. In practice, this set of questions and answers can be generated as a super-set of the Yes-No Questions set. First, a sub-dialog starting from the first utterance of a given dialog is extracted under the condition that a given slot is not informed in the corresponding annotation. Then, a question-answering question is generated for that slot, with the ground truth answer "maybe".

4. Counting and Lists/Sets

This task provides the capacity of the model 60 to perform simple counting operations, by asking about the number of objects with a certain property, e.g., "How many areas are requested?" and providing a ground truth answer based on the number of areas requested in the given dialog. Similarly, the model can be trained to produce a set of single word answers in the form of a list, e.g., to output an answer {Midtown, Uptown} in answer to "What are the areas requested?"

Table 1 gives an example of each of the question types on a dialog sample of the Second Dialog State Tracking Challenge (DSTC-2) dataset. See, for example, Matthew Henderson, et al., "The second dialog state tracking challenge," Proc. SIGDIAL Conf., ACL, pp. 263-272, 2014. As in Jason Weston, et al., "Memory networks," arXiv:1410.3916, 2014, a listed answer will be considered as a single element in the answer set. A possible alternative would be to change the activation function used at the output of the MemN2N from a Softmax activation function to a logistic one and to use a categorical cross entropy Loss. A drawback of such alternative would be the necessity of cross-validating a decision threshold in order to select eligible answers.

TABLE 1

Dialog state tracking question-answering examples from the DSTC2 dataset

| Index | Actor | Utterance |
| --- | --- | --- |
| 1 | Cust. | Im looking for a cheap restaurant in the west or east part of town. |

TABLE 1-continued

Dialog state tracking question-answering
examples from the DSTC2 dataset

| Index | Actor | Utterance |
|---|---|---|
| 2 | Agent | Thanh Binh is a nice restaurant in the west of town in the cheap price range. |
| 3 | Cust. | What is the address and post code. |
| 4 | Agent | Thanh Binh is on magdalene street city centre. |
| 5 | Cust. | Thank you goodbye. |
| 6 | | Factoid Question What is the pricerange? Answer: {Cheap} |
| 7 | | Yes/No Question Is the Pricerange Expensive? Answer: {No} |
| 8 | | Indefinite Knowledge Is the FoodType Chinese? Answer: {Maybe} |
| 9 | | Listing task What are the areas? Answer: {West, East} |

The method is not limited to such reasoning capabilities. Other reasoning capabilities may be provided, such spatial and temporal reasoning or deduction as suggested in Weston 2015, for example, by developing another dedicated resource 124. Another alternative could be to develop a question-answering annotation task based on a dialog corpus where reasoning tasks are present.

Having a dialog state tracker where a policy is built on top can promote dialog achievement by optimizing a reward function throughout an explicitly learnt dialog policy. In the case of proper end-to-end systems, the objective function is still not explicitly defined (Iulian Vlad Serban, et al., "A survey of available corpora for building data-driven dialogue systems," CoRR, 2015) and the resulting systems tend to be used in the context of chat-oriented and non-goal oriented dialog systems.

A system and method of dialog state tracking based on the general field of machine reading and solved using a memory-enhanced neural network architecture (MemN2N), have been described. A specific dataset format has been developed for the task of dialog state tracking. The exemplary method offers several advantages over existing methods of tracking. First, the method allows tracking to be performed on the basis of dialog-level and sub-dialog level annotations, instead of solely at the utterance-level. Second, reasoning capability specific dialog corpora 124 can be generated to exploit the reasoning capabilities of the model. The memory enhanced inference model described herein is able to cope with reasoning capabilities that are nearly impossible with existing approaches to state tracking, such as recurrent neural networks.

Without intending to limit the scope of the exemplary embodiment, the following examples illustrate the application of the method.

EXAMPLES

Experiments were performed using the DSTC-2 dataset 64 and its conversion for performing the four above-mentioned reasoning tasks. First, the generation of a machine reading type of dataset from the publicly available DSTC-2 corpus is described. Experimental results are then provided.

Dataset and Data Preprocessing

The DSTC-2 dialog domain, described in Jason D. Williams, et al., "The dialog state tracking challenge," Proc. SIGDIAL 2013 Conf., pp. 404-413, 2013, is used as a basis for evaluating the method. In this dialog corpus, the user queries a database of local restaurants by interacting with a dialog system. A dialog proceeds as follows: first, the user specifies constraints concerning the restaurant. Then, the system offers the name of a restaurant that satisfies the constraints. Finally, the user accepts the offer and requests additional information about the accepted restaurant. In this context, the dialog state tracker should be able to track several types of information that compose the state, such as the geographic area, the food type, and the price range slots. In the following examples, only these three variables are tracked, but it is to be appreciated that the dialog state tracker can be easily adapted to track other variables.

In order to make comparable experiments, subdialogs formed from the first utterance to each utterance of each dialog of the dataset are extracted. A subdialog can thus include from two to t utterances, where t is the total number of utterances in the dialog. The corresponding question-answer pairs are generated using the annotated state ground truth for each of the subdialogs. This setting enables a fair comparison at the utterance level of state tracking gains over existing methods. The same protocol is adopted for the generated reasoning task.

The tracker task entails finding the optimum value l* of each variable being tracked. In the overall dialog corpus, the Area slot evidences 5 possible values, the Food slot has 91 possible values and Pricerange slot has 3 possible values. In order to exhibit reasoning capability of the model 60 in the context of dialog state tracking, three other datasets 124 have been automatically generated from the DSTC-2 corpus in order to support the three other capabilities of reasoning described above.

Dialog modification is employed for two reasoning tasks, List and Count. Two types of grammar based rules are considered for generating a modified dialog corpus 124. One of these, string matching, is performed to determine the position of a slot value in a given utterance and an alternative utterance is produced. For example, the utterance "I'm looking for a chinese restaurant in the north" can be replaced by "I'm looking for a chinese restaurant in the north or the west". A second type of modification is performed in an inter-utterance fashion, for example, by assuming a given value "north" has been informed in the current state of a given dialog.

Training the Model

One MemN2N neural network model 60 for each slot is trained by stochastic gradient descent. 10% of the training set was held-out to form a validation set for hyperparameter tuning, as suggested in Sainbayar Sukhbaatar, et al., "End-to-end memory networks," Annual Conference on Neural Information Processing Systems (NIPS) 28, pp. 2440-2448, 2015. The hyperparameters may include number of hops, and the dimension of the embedding of the vectorial representation of words. Moreover, position encoding, adjacent weight tying, and temporal encoding are performed with 10% random noise. The learning rate $\eta$ is initially assigned a value of 0.005, with exponential decay applied every 25 epochs by $\eta/2$ until 100 epochs are reached (each epoch using the complete set of training data). Linear start is used in all the experiments, as proposed by Sukhbaatar. With linear start, the softmax in each memory layer is removed and re-inserted after 20 epochs. Each mini-batch includes a set of (q, a, d) triples drawn from the training data. Mini-batch size for each update of the model parameters is set to 16 and the $l_2$ norm of the whole gradient of all parameters is measured and if larger than L=40, then it is scaled down to have norm L of 40. All weights are initialized randomly from a Gaussian distribution with zero mean and $\sigma=0.1$. Except where noted, the number of internal hops between the memory and the decision stack is set to 3.

Experimental Results

Table 2 provides detailed results obtained by the machine reading model 60 for state tracking on three tracked variables of the DSTC-2 dataset formulated for a one supporting fact question answering task. Accuracy is measured as the F1 score. In this context, a memory enhanced model allows results to be achieved that are competitive to a non-memory enhanced, recurrent neural network (RNN) model (Matthew Henderson, et al., "Robust dialog state tracking using delexicalised recurrent neural networks and unsupervised adaptation," Proc. IEEE Spoken Language Technology, pp. 360-365, 2014), where an overall accuracy of 0.784 is obtained. For the present method, accuracy is shown for different embedding sizes n.

TABLE 2

One supporting fact task: Accuracy (F1) obtained on the DSTC2 dataset

| Embedding size n | Variable | | | |
|---|---|---|---|---|
| | Food | Area | PriceRange | Joint-Slot-Set |
| 20 | 0.87 | 0.89 | 0.95 | 0.79 |
| 40 | 0.88 | 0.88 | 0.92 | 0.83 |
| 60 | 0.86 | 0.87 | 0.92 | 0.81 |

Table 3 shows the performance obtained for the four reasoning tasks described above, using different values of n.

TABLE 3

Reasoning tasks: Accuracy on DSTC2 reasoning datasets

| Variable | Embedding size n | Yes-No | Indefinite Knowledge | Count. | List. |
|---|---|---|---|---|---|
| Food | 20 | 0.85 | 0.79 | 0.89 | 0.41 |
| | 40 | 0.83 | 0.84 | 0.88 | 0.42 |
| | 60 | 0.82 | 0.82 | 0.90 | 0.39 |
| Area | 20 | 0.86 | 0.83 | 0.94 | 0.79 |
| | 40 | 0.90 | 0.89 | 0.96 | 0.75 |
| | 60 | 0.88 | 0.90 | 0.95 | 0.78 |
| PriceRange | 20 | 0.93 | 0.86 | 0.93 | 0.83 |
| | 40 | 0.92 | 0.85 | 0.90 | 0.80 |
| | 60 | 0.91 | 0.85 | 0.91 | 0.81 |

The obtained results indicate that the memory-enhanced models 60 are a competitive alternative for the task of dialog state tracking.

Tables 4-10 provide additional examples of machine reading tasks.

TABLE 4

Attention shifting example for the Area slot from DSTC2 dataset

| Actor | Utterance | Hop1 | Hop 2 | Hop 3 | Hop 4 | Hop 5 |
|---|---|---|---|---|---|---|
| Cust | Im looking for a cheap restaurant that serves chinese food | 0.00 | 0.18 | 0.11 | 0.04 | 0.00 |
| Agent | What part of town do you have in mind | 0.33 | 0.30 | 0.00 | 0.00 | 0.00 |
| Cust | I dont care | 0.00 | 0.00 | 0.17 | 0.37 | 1.00 |
| Agent | Rice house serves chinese food in the cheap price range | 0.01 | 0.00 | 0.00 | 0.00 | 0.00 |
| Cust | What is the address and telephone number | 0.58 | 0.09 | 0.01 | 0.00 | 0.00 |
| Agent | Sure rice house is on mill road city center | 0.03 | 0.00 | 0.00 | 0.00 | 0.00 |
| Cust | Phone number | 0.00 | 0.00 | 0.00 | 0.00 | 0.00 |
| Agent | The phone number of rice house is 765-239-09 | 0.02 | 0.01 | 0.00 | 0.00 | 0.00 |
| Cust | Thank you good bye | 0.02 | 0.42 | 0.71 | 0.59 | 0.00 |

What is the area ? Answer: dontcare

TABLE 5

One supporting fact task: A machine reading task formulated dialog state tracking learning example for the Food slot from the DSTC2 dataset

| Index | Actor | Utterance |
|---|---|---|
| 1 | Cust | West part of town cuban food. |
| 2 | Agent | Sorry there is no cuban restaurant in the west of town. |
| 3 | Cust | Ok, do you have an Italian place ? |
| 4 | Agent | Prezzo is a nice restaurant in the west of town serving italian food. |
| 5 | Cust | Phone number. |
| 6 | Agent | You are looking for a restaurant is that right ? |
| 7 | Cust | Yes. |
| 8 | Agent | Prezzo is a nice restaurant in the west of town serving italian food. |
| 9 | Cust | What is the phone number ? |
| 10 | Agent | The phone number of prezzo is 097 6567 865. |
| 11 | Cust | Goodbye. |
| 12 | | What is Food ? Answer: Italian - Supporting Fact: 3 |

TABLE 6

One supporting fact task: A machine reading task formulated dialog state tracking learning example for the Area slot from DSTC2 dataset

| Index | Actor | Utterance |
|---|---|---|
| 1 | Cust | I'm looking for italian food. |
| 2 | Agent | Would you like something in the cheap moderate or expensive price range ? |
| 3 | Cust | Moderate. |
| 4 | Agent | What part of town do you have in mind ? |
| 5 | Cust | North. |
| 6 | Agent | Sorry there is no moderate restaurant in the north of town serving italian food. |
| 7 | Cust | Thank you good bye. |
| 8 | | What is Area ? Answer: North - Supporting Fact: 5 |

TABLE 7

One supporting fact task: A machine reading task formulated dialog state tracking learning example for the Pricerange slot from DSTC2 dataset

| Index | Actor | Utterance |
|---|---|---|
| 1 | Cust | What kind of restaurant that serves french food. |
| 2 | Agent | Restaurant two two serves french food. |
| 3 | Cust | I dont care about the price range with the address. |
| 4 | Agent | Sure restaurant two two is on chesterton road chesterton. |
| 5 | Cust | Thank you goodbye. |
| 6 | | What is Pricerange? Answer: Dontcare - Supporting Fact: 3 |

TABLE 8

Yes-No question task: A machine reading task formulated dialog state tracking learning example for the Area slot from DSTC2 dataset

| Index | Actor | Utterance |
|---|---|---|
| 1 | Cust | I need a moderately priced north part of town. |
| 2 | Agent | You are looking for a restaurant is that right. |
| 3 | Cust | Yes. |
| 4 | Agent | Golden wok is a nice restaurant in the north of town in the moderate price range. |
| 5 | Cust | What is the address and phone number of. |
| 6 | Agent | The phone number of golden wok is 987 678 65 and it is on histon road chesterton. |
| 7 | Cust | Thank you good bye. |
| 8 | | Is area north ? Answer: Yes - Supporting Fact: 1 |

TABLE 9

Indefinite knowledge task: A machine reading task formulated dialog state tracking learning example for the Food slot from DSTC2 dataset

| Index | Actor | Utterance |
|---|---|---|
| 1 | Cust | I'm looking for a cheap restaurant in north. |
| 2 | Agent | The royal spice is a nice restaurant in the north of town in the cheap price range. |
| 3 | Cust | I would like the phone number. |
| 4 | Agent | The phone number of royal spice is 987 678 65. |
| 5 | Cust | Thank you goodbye. |
| 6 | | Is food Indian ? Maybe - Supporting Fact: 1 |

TABLE 10

Counting task: A machine reading task formulated dialog state tracking learning example for the Food slot from DSTC2 dataset

| Index | Actor | Utterance |
|---|---|---|
| 1 | cust | I'd like a portuguese or brazilian restaurant. |
| 2 | Agent | Nandos city centre serves portuguese food. |
| 3 | Cust | What is the address. |
| 4 | Agent | sure nandos city centre is on 17 - saint andrews street. |
| 5 | Cust | Thank you good bye. |
| 6 | | How many food ? Answer: Two - Supporting Fact: 1 |

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for dialog state tracking during a dialog between a user and an agent, the method comprising:
   a) providing a recurrent neural network model which has been trained to receive a representation of one of a set of questions and a representation of an input subpart of a dialog, and to output an answer to the question based on the representation of the subpart of the dialog, the training of the neural network including:
      i) providing training dialogs, each training dialog being associated with at least one of the set of questions and a respective ground truth answer to the associated question, each of the questions being related to a respective one of a plurality of slots of a dialog state tracker,
      ii) for each of the set of questions, generating a respective question representation,
      iii) inputting a representation of one of the training dialogs into the neural network model,
      iv) inputting the question representation of one of the questions associated with the respective training dialog into the neural network model,
      v) receiving a predicted answer from the model, and
      vi) updating parameters of the model to reduce an error between the predicted answer and the ground truth answer;
   b) for at least one iteration of a dialog between a user and an agent:
      i) receiving an input subpart of the dialog between the user and the agent;
      ii) generating a representation of the subpart of the dialog;
      iii) inputting the representation of the subpart of the input dialog to the trained neural network model;
      iv) inputting one of the question representations of one of the set of questions to the trained neural network model; and
      v) receiving an answer output by the neural network model based on the input question representation and the input representation of the subpart of the input dialog; and
   c) for at least one of the at least one iteration of the dialog between the user and the agent:
      i) with the dialog state tracker, updating a dialog state for the dialog based on the output answer to the question, the dialog state including a set of variables, the updating including predicting a value for at least one of the variables,
      ii) generating a dialog act of the agent, based on the updated dialog state, and
      iii) outputting the dialog act to the user in a human recognizable form;
   wherein the representations of the questions and the representations of the dialog subparts are each multi-dimensional vectors, elements of each vector representing a respective word or multi-word expression in a predefined vocabulary, the predefined vocabulary having been generated by ranking words and multi-word expressions in the training dialogs and optionally also in the associated questions, and selecting top-ranking ones for the vocabulary;
   wherein at least one of the generating a representation of the subpart of the dialog, inputting the representation of the subpart of the dialog to the trained neural network model, receiving an answer to the question output by the model, and updating a dialog state is performed with a processor.

2. The method of claim 1, wherein the training the neural network model further comprises generating a modified set of training dialogs from the set of training dialogs and training the neural network model with at least one of:
   questions where the answer is one of yes and no;
   indefinite knowledge questions where the answer is unknown; and
   questions for which the answer is a number or a list of values.

3. The method of claim 1, wherein for at least some of the training dialogs, the training dialog includes a plurality of utterances, the plurality of utterances including an agent utterance and a user utterance and wherein the respective answer to the represented question is linked to the entire dialog and is not specifically linked to a specific one of the plurality of utterances.

4. The method of claim 1, wherein the multidimensional vectors representing the question and the input dialog subpart each have a same number of dimensions.

5. The method of claim 1, wherein the neural network model includes a question embedding matrix which embeds the question into an embedding space and at least one dialog embedding matrix which embeds the representation of the subpart of the dialog into the same embedding space.

6. The method of claim 5, wherein the neural network model includes memories which store embeddings of a set of dialog representations, the set of dialog representations including the representation of the subpart of the dialog.

7. The method of claim 1, wherein the neural network model comprises a plurality of hops, each subsequent hop receiving as input the output of a prior hop, the output including a question embedding and a response vector, the response vector being a weighted sum of an output set of memory vectors generated by embedding the dialog representations, wherein the output memory vectors are each weighted by a respective probability vector for the embedded question computed with respect to a respective one of an input set of memory vectors generated by embedding the dialog representations.

8. The method of claim 1, wherein the neural network model comprises a plurality of neural network models, each of the neural network models corresponding to a respective one of the variables in the dialog state.

9. The method of claim 1, wherein the neural network model is a memory-enhanced neural network.

10. The method of claim 1, wherein the dialog includes user utterances and agent utterances.

11. The method of claim 1, wherein the representation of the subpart of the input dialog comprises a representation of at least one of:
   a user utterance in a natural language; and
   an agent utterance in the natural language.

12. The method of claim 1, further comprising executing a task based on the updated dialog state of at least one of the iterations.

13. The method of claim 1, further comprising generating an agent dialog act based on the updated dialog state.

14. A computer program product comprising non-transitory memory storing instructions which, when executed by a computer, perform the method of claim 1.

15. A system for dialog state tracking comprising:
   memory which stores a neural network model which has been trained to receive a representation of one of a set of questions and a representation of an input subpart of a dialog and to output an answer to the question based on the representation of the subpart of the dialog,
   the neural network model including input and output memories which store embeddings of dialog representations embedded with first and second embedding matrices, respectively, and a third embedding matrix which generates an embedding of the question of the same number of dimensions as the embeddings of the dialog representations;
   a dialog representation generator which generates a representation of an input subpart of a dialog;
   a prediction component which inputs the representation of the subpart of the dialog and a representation of one of the set of questions used in the training to the trained neural network model and receives an answer output by the neural network model based on the representation of the question and the representation of the subpart of the dialog;
   an update component which updates a dialog state for the dialog, based on the answer to the question, the dialog state including a set of variables, the updating including predicting a value for at least one of the variables;
   an output component which outputs a dialog act in the form of speech, text, or information for generation of the speech or text, based on the updated dialog state for the dialog; and
   a hardware processor which implements the dialog representation generator, prediction component, update component and output component;
   wherein the representations of the questions and the representations of the input subpart are each multidimensional vectors, elements of the multi-dimensional vectors representing a respective word or multi-word expression in a predefined vocabulary, the predefined vocabulary having been generated by ranking words and multi-word expressions in the training dialogs and optionally also in the associated questions, and selecting top-ranking ones for the vocabulary.

16. The system of claim 15, further comprising a learning component which trains the neural network model on representations of training dialogs, representations of questions, and a respective answer to at least one of the questions for the respective dialog representation, each of the training dialog representations comprising a representation of at least a subpart of a training dialog in a set of training dialogs.

17. A method for training a dialog state tracking system of a dialog system, comprising:
   providing a set of triples, each of the triples including a dialog subpart, one of a set of natural language questions, and a ground truth answer to the natural language question, the ground truth answer having been provided by an annotator based on the dialog subpart, each of the questions being related to a respective one of a plurality of slots of a dialog state tracker;
   providing a representation generator for generating representations of the dialog subparts, and the questions, the representations of the questions and the representations of the input subpart each being multidimensional vectors, elements of the multi-dimensional vectors representing a respective word or multi-word expression in a predefined vocabulary, the predefined vocabulary having been generated by ranking words and multi-word expressions in the dialog subparts, and optionally also the questions, in the triples, and selecting top-ranking ones for the vocabulary;
   training a memory end-to-end neural network model comprising, for a plurality of iterations, with a processor:

inputting a representation of the dialog subpart and a representation of the question of at least one of the triples to the memory end-to-end neural network model;

outputting a predicted answer from the model based on the dialog subpart and question; and updating parameters of the model to reduce a computed error between the predicted answer and the ground truth answer for the at least one of the triples;

storing the trained model with updated parameters of at least one of the iterations in memory;

providing a dialog state tracker with an update component in memory, whereby, when a new dialog subpart is received, a representation of the dialog subpart and a representation of one of the set of questions are able to be input to the stored model for predicting an answer to the question, the update component updating the respective slot of the dialog state based on the answer; and providing an output component which outputs a dialog act in in the form of speech, text, or information for generation of the speech or text, based on the updated dialog state for the dialog.

* * * * *